(12) United States Patent
Qian et al.

(10) Patent No.: US 9,534,693 B2
(45) Date of Patent: Jan. 3, 2017

(54) VALVE WITH A HINGED VALVE CORE

(71) Applicant: SHANGHAI HONGYAN RETURNABLE TRANSIT PACKAGINGS CO., LTD, Shanghai (CN)

(72) Inventors: Zuocheng Qian, Shanghai (CN); Zhengwei Fang, Shanghai (CN); Kai Gong, Shanghai (CN); Fang Yuan, Shanghai (CN); Qingxin Liao, Shanghai (CN)

(73) Assignee: Shanghai Hongyan Returnable Transit Packagings Co., Ltd., Shanghai (CN)

( * ) Notice: Subject to any disclaimer, the term of this patent is extended or adjusted under 35 U.S.C. 154(b) by 0 days.

(21) Appl. No.: 14/648,562

(22) PCT Filed: Nov. 29, 2013

(86) PCT No.: PCT/CN2013/088228
§ 371 (c)(1),
(2) Date: May 29, 2015

(87) PCT Pub. No.: WO2014/082601
PCT Pub. Date: Jun. 5, 2014

(65) Prior Publication Data
US 2015/0300504 A1 Oct. 22, 2015

(30) Foreign Application Priority Data
Nov. 30, 2012 (CN) .......................... 2012 1 0507300

(51) Int. Cl.
*F16K 1/50* (2006.01)
*F16K 1/20* (2006.01)
(Continued)

(52) U.S. Cl.
CPC ........... *F16K 1/2007* (2013.01); *F16K 31/521* (2013.01); *F16K 31/54* (2013.01); *F16K 31/60* (2013.01)

(58) Field of Classification Search
CPC ....... F16K 1/2007; F16K 31/521; F16K 31/54; F16K 31/60
(Continued)

(56) References Cited

U.S. PATENT DOCUMENTS 18,912 A * 12/1857 Ketcham ................. F16K 31/53
251/249.5
304,874 A * 9/1884 THompson ............... F16N 7/06
184/86
(Continued)

FOREIGN PATENT DOCUMENTS

CN 2162563 4/1994
CN 1298070 6/2001
(Continued)

OTHER PUBLICATIONS

International search report for International application No. PCT/CN2013/088228, dated Feb. 27, 2014 (3 pages).

*Primary Examiner* — Eric Keasel
*Assistant Examiner* — Minh Le
(74) *Attorney, Agent, or Firm* — Hamre, Schumann, Mueller & Larson, P.C.

(57) ABSTRACT

The present invention relates to a valve with a hinged valve core. The valve comprises a valve body, a valve core, an operating mechanism, a motion-transferring device and a locking device. The valve body is a housing. The housing is formed with a operating hole used to partially accommodate the operating mechanism and a channel having an inlet and an outlet. The valve core is connected with the valve body through a hinge. The operating mechanism is used to operate the valve core to be rotated around the central axis of the (Continued)

hinge to open/close the valve. The motion-transferring device is used to transfer actions on the operating mechanism to the valve core, and when the valve is closed or open, the valve core is locked on the valve body through the locking device. The valve of the present invention has a compact structure, is easy to operate, requires a small torque for opening and allows a large flow when opened.

13 Claims, 17 Drawing Sheets

(51) Int. Cl.
*F16K 31/52* (2006.01)
*F16K 31/54* (2006.01)
*F16K 31/60* (2006.01)

(58) Field of Classification Search
USPC .................. 251/250, 298, 284, 286, 251
See application file for complete search history.

(56) References Cited

U.S. PATENT DOCUMENTS

| | | | | | |
|---|---|---|---|---|---|
| 743,745 | A | * | 11/1903 | McElroy | B60H 1/00857 251/250.5 |
| 1,504,508 | A | * | 8/1924 | Richardson | F02M 1/00 137/628 |
| 2,504,006 | A | * | 4/1950 | Davis | F16K 15/181 137/514 |
| 2,673,061 | A | * | 3/1954 | Broz | F16K 1/24 251/163 |
| 2,699,318 | A | * | 1/1955 | Ellison | F16K 1/2028 251/158 |
| 2,934,310 | A | * | 4/1960 | Kinney | F16K 1/24 251/163 |
| 2,983,479 | A | * | 5/1961 | Thomas | F16K 5/0647 251/172 |
| 2,999,666 | A | * | 9/1961 | Sjogren | F16K 27/02 251/228 |
| 3,119,594 | A | * | 1/1964 | Heggem | F16K 31/5282 251/228 |
| 3,334,858 | A | * | 8/1967 | Hay | F16K 1/2028 251/158 |
| 4,073,470 | A | * | 2/1978 | Harris | F16K 1/24 251/161 |
| 4,073,472 | A | * | 2/1978 | Chasey | F16K 1/24 251/229 |
| 4,792,116 | A | * | 12/1988 | Huber, Jr. | F16K 1/24 137/375 |
| 4,815,693 | A | * | 3/1989 | James | F16K 31/602 251/109 |
| 4,976,403 | A | * | 12/1990 | Bramblet | F16K 5/0647 251/129.01 |
| 5,269,339 | A | * | 12/1993 | Szatmary | F16K 31/54 137/312 |
| 5,329,959 | A | * | 7/1994 | Owen | F16K 35/06 137/315.17 |
| 5,950,982 | A | * | 9/1999 | Williams | F16K 35/10 251/285 |
| 6,959,909 | B2 | * | 11/2005 | Bancroft | F16K 31/602 137/385 |
| 7,114,510 | B2 | * | 10/2006 | Peters | F16K 31/60 137/1 |
| 8,123,196 | B1 | * | 2/2012 | Chernoff | F16K 1/165 251/228 |
| 8,317,158 | B2 | * | 11/2012 | Patterson | F16K 1/20 137/527.8 |
| 8,740,180 | B2 | * | 6/2014 | Matsushita | F16K 35/025 137/269 |
| 9,038,381 | B2 | * | 5/2015 | Ehrmann | F02B 37/186 60/602 |
| 2004/0007685 | A1 | * | 1/2004 | Chang | F16K 31/54 251/250 |
| 2009/0230340 | A1 | * | 9/2009 | Purkis | E21B 34/12 251/228 |
| 2009/0261285 | A1 | * | 10/2009 | Quinn | F16K 1/2028 251/298 |
| 2012/0073408 | A1 | * | 3/2012 | Leighton | B25B 13/06 81/177.2 |
| 2013/0228242 | A1 | * | 9/2013 | Languedoc | F16K 1/2007 137/527 |

FOREIGN PATENT DOCUMENTS

| | | |
|---|---|---|
| CN | 1671983 | 9/2005 |
| CN | 2929383 | 8/2007 |
| CN | 101701641 | 5/2010 |
| CN | 102979925 | 3/2013 |
| CN | 202992202 | 6/2013 |
| EP | 2362123 | 8/2011 |
| FR | 2858840 | 2/2005 |

* cited by examiner

VALVE WITH A HINGED VALVE CORE

FIELD

The present invention relates to valves, in particular to valves used in IBC.

BACKGROUND

Current valves used in IBCs, such as butterfly valves, are opened through rotating the central rotating shaft, which drives the two sides of the valve core to open. Since the valve core is generally located within the interior of the valve body, the flow will be affected by the valve core and the rotating shaft. Further, current valves have poor sealing performances. In addition, the force required to open/close the valve is huge due to the friction between the sealing ring and the valve body of the butterfly valves.

There has recently developed a guide slot lifting rod ball valve at domestic and abroad. There provided on the valve rod a S-shaped guide slot, which is engaged with the guide pin, so that when the valve rod rises, it causes the ball to disengage from the valve seat. Then, the valve rod further rotates 90° counterclockwise and fully open the valve. When the valve rod is moving down, the ball rotates 90° clockwise, then being pressed towards the valve seat to close the valve. The shortcomings of the technology is that a long S-shaped guide slot being provided on the valve rod, thus, when the valve rotates for opening or closing, the valve rod needs to move up and down spirally along the guide slot, resulting in a huge space for the guide slot and a large rotation angle and other shortcomings.

Chinese Patent Application No. 99124192.4 has disclosed a structure for opening and closing a valve, which is a disk-shaped two-track rotary with deploy-close structure. The structure comprises a fixed disk, a rotating disk and a stop pin. When the external force drives the valve rod together with the rotating disk to move the stop pin, the stop pin rotates clockwise along the "arc" track of the fixed disk. When rotated to the "straight" track connected to the "arc" rail track, the rotating disk rotates clockwise further, and the stop pin deploys the surrounding of the fixed disk along the "straight" track of the fixed disk under the forced action by the "deploy-close" track of the rotating disk. At this time, the stop pin structure together with the valve sealing structure close to the valve seat, thus close the valve. When the valve rotates counter-clockwise together with the rotating disk, the stop pin together with the sealing structure move towards the centre of the fixed disk along the "straight" track of the fixed disk under the forced action by the "deploy-close" track of the rotating disk, and then rotate counter-clockwise along the "arc" track of the fixed disk to open the valve. The technical shortcoming of the patent is to use the "arc connected with straight line" track, which requires high precision and complex processing. Further, since the valve cartridge is a combined sphere, it is difficult to get a balanced preload force, resulting in damage to the valve cartridge and shortening the life of the valve.

Chinese Patent No. 200620105067 has disclosed an orbit plug valve, comprising a valve body, a valve cover, an operating member, a valve rod, a valve seat, a valve plug which together with the valve seat forming a conical surface sealing, and an orbital mechanism. The orbital mechanism comprises a track with two guide slots mounting on the neck portion of the valve plug and a plate with two guide pins inserting into said guide slots, as well as a lock nut and an adjusting ring for adjusting the mounting position of the track. The shortcomings of the present patent are that the transmission device structure is complex, and extremely occupy the external space of the valve body. Further the transmission device involves more parts, resulting in complicated assembly process. In addition, since the valve has a plug forming a cone surface sealing as well as a lock nut and an adjusting ring for adjusting the mounting position of the track, it must be adjusted several times, resulting in complex operation.

SUMMARY

The object of the present invention is to provide a valve having a compact structure, being easy to operate, requiring a small torque for opening and allowing a large flow when opened.

To achieve the object mentioned above, the present invention provides a valve with a hinged valve core, comprising a valve body, a valve core, an operating mechanism, a motion-transferring device and a locking device, the valve body is a housing, and the housing is formed with a operating hole used to partially accommodate the operating mechanism and a channel having an inlet and an outlet is formed in the housing. The valve core is connected with the valve body through a hinge. The operating mechanism is used to operate the valve core to be rotated around the central axis of the hinge to open/close the valve. The motion-transferring device is used to transfer actions on the operating mechanism to the valve core. When the valve is closed or opened, the valve core is locked on the valve body through the locking device.

Preferably, the hinge is constructed of hinge shafts provided on the valve core and hinge holes provided at the inlet of the channel of the valve body. The valve core will be rotated around a central axis of the hinge shafts and the hinge holes to open/close the valve when assembled.

Preferably, the operating mechanism is provided with stopping projection and positioning ribs. The valve body is provided with positioning columns. The stopping projections and the positioning ribs are engaged with the positioning columns so that the valve is maintained in an open/closed state.

In a preferred embodiment of the present invention, guiding grooves are provided over the channel of the valve body. The operating mechanism comprises a handle and an operating member, wherein the bottom of the operating member is provided with a gear and a locking hook. The motion-transferring device is a plate-shaped member having a plate-shaped body, wherein a hole is provided at the middle portion of the plate-shaped body and a rack is provided one sidewall surrounding the hole. The rack is used to be engaged with the gear provided on the operating member to achieve motion-transferring between the operating member and the motion-transferring mechanism. One end of the plate-shaped body is provided with a driving rod. One side of the plate-shaped body is provided with sliding rails. The sliding rails are engaged with the guiding grooves provided on the valve body, so that the motion-transferring mechanism is movable in the valve body along the guiding grooves. The valve core has a disc-shaped body, wherein the outer periphery of the body is integrally provided with the hinge shafts. One side of the body is a smooth surface, and the other side is provided with a locking pole. A sliding slot is provided between the locking pole and the body, and wherein the locking pole is used to be engaged with the locking hook of the motion-transferring device. The sliding slot is used to be engaged with the driving rod of the motion-transferring device to open/close the valve.

Preferably, the locking hook comprises an initial portion, an intermediate portion and a terminal portion, wherein the initial portion is an inclined surface acting as a direction guide. The locking hook is used to be engaged with a locking pole provided on the valve core 4, so that during closing the valve, when the locking pole contacts with the initial portion of the locking hook, the initial portion will apply an inward force on the locking pole under the effect of the inclined surface as the operating member is further rotated, and when the locking pole is pulled to the intermediate, portion, a side surface of the locking pole is engaged with the terminal portion of the locking hook, and the valve is tightly closed and locked at this point.

Preferably, the sliding slot is an elongated slot.

In another preferred embodiment of the present invention, the operating mechanism comprises a handle and an operating member, wherein a driving column integrally projects from the bottom of the operating member and is used to be engaged with the motion-transferring device to achieve motion-transferring. A step is formed at the end of the driving column so that the driving column is rotatably maintained in the motion-transferring device without running out when assembled. The central axis of the driving column deviates a distance from the central axis of the operating member, thereby the driving column and the motion-transferring device form an eccentric cam mechanism together. The motion-transferring device is constituted by a transmission member and a cross member, wherein the transmission member has a body. One lug extends from one side of the body and provided with a driving hole to be engaged with the driving column. Two parallel lugs are extended from the other side of the body and are provided with coaxial driving holes respectively. The valve core has a disc-shaped body, wherein the outer periphery of the body is integrally provided with hinge shafts. One side of the body is a smooth surface, while the other side is provided with two parallel ribs. The ribs are respectively provided with two lugs at the upper portion thereof. The two lugs are respectively provided with opening/closing holes. The driving hole and the opening/closing holes are connected with the cross member to form a universal joint structure together, such that actions on the operating mechanism are transferred to the valve core to open/close the valve.

In a further preferred embodiment of the present invention, the operating mechanism is constituted by a handle, an operating member and a locking member. The bottom of the operating member is formed with a positioning hole and an anti-off buckle integrally projects therefrom. The locking member has a plate-shaped body provided with an anti-off hole. A positioning column integrally extends from the upper surface of the plate-shaped body, while a driving column extends from the lower surface of the plate-shaped body near one end of the plate-shaped body. The end of the driving column is formed with a step, so that the driving column is rotatably maintained in the driving hole of the motion-transferring device without disengagement when assembled. The other end of the plate-shaped body is provided with a locking hook. The motion-transferring device is constituted by a transmission member and a cross member, wherein the transmission member has a body which has a lug extending from one end thereof and two parallel lugs extending from the other end thereof. The lug is provided with a driving hole to be engaged with the driving column. Two coaxial driving holes are respectively provided on said two parallel lugs.

The valve core has a disc-shaped body, wherein the outer periphery of the body is integrally provided with hinge shafts. One side of the body is a smooth surface, while the other side is provided with two parallel ribs. The upper portions of the ribs are respectively provided with two lugs. The two lugs are respectively provided with opening/closing holes. A locking pole is provided between the two ribs.

The driving hole and the opening/closing holes are connected with the cross member to form a universal joint structure together, thus actions on the operating mechanism are transferred to the valve core to open/close the valve. The locking hook is engaged with the locking pole so that the valve is maintained in a closed position when the valve is closed.

Preferably, the lower part of the operating member is provided with a snapping slot used to be engaged with the snap so that the operating member is rotatably held on the valve body.

Preferably, sealing rings are respectively provided between the valve core and valve body, and between the operating mechanism and the valve body.

In the valve of present invention, since the valve core is connected with the valve body via a hinge, the valve core can be rotated around the central axis of the hinge to achieve opening/closing of the valve. When opened, there is no stopping member in the fluid channel of the valve body, which allows a large flow. Besides, adopting a hinge connecting manner provides a valve having simple, compact structure and a low manufacturing cost, being easy to operate, as well as requiring a small torque for opening/closing.

DRAWINGS

DESCRIPTIONS

Figure 1:
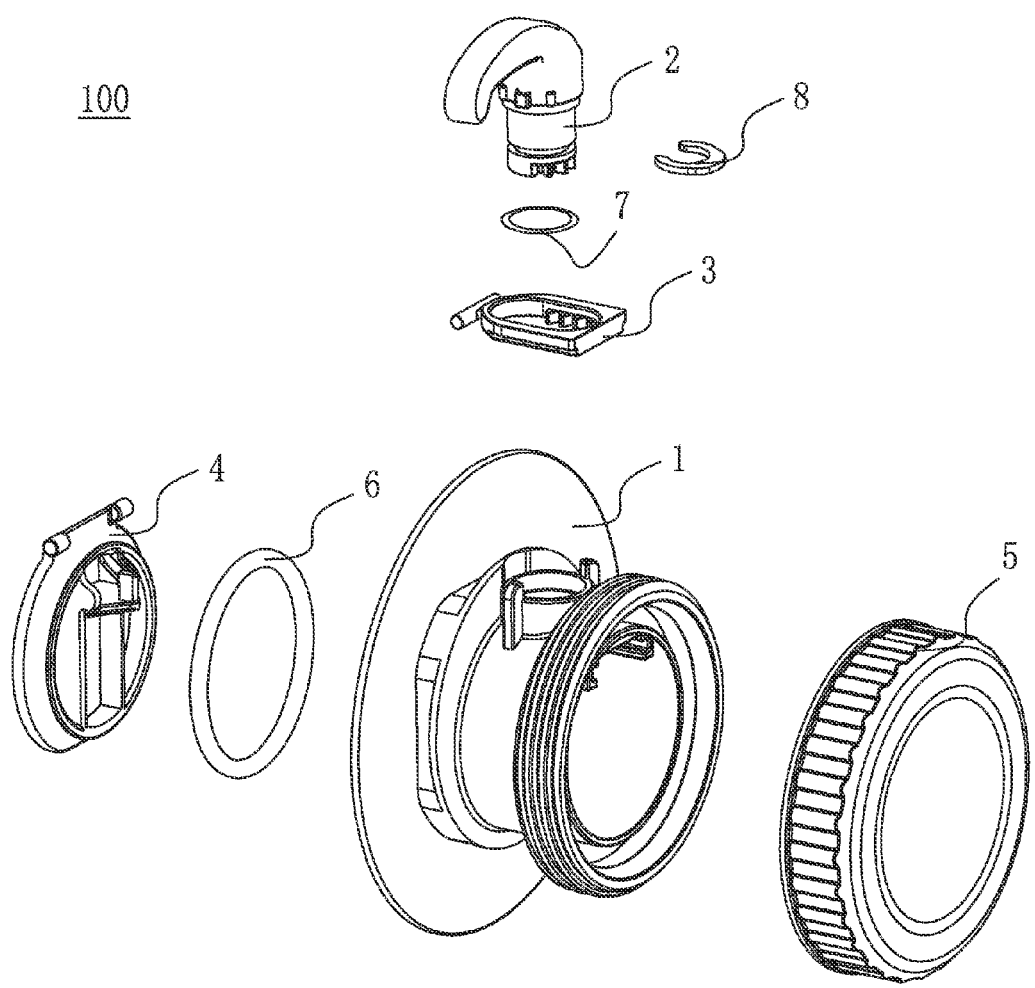
FIG. 1 is an exploded perspective view illustrating a valve with a hinged valve core according to the first embodiment of the present invention.

Hereinafter, preferred embodiment of the present invention will be described in detail with reference to the drawings, so that the purposes, features and advantages of the present invention will be more clearly understood. It should be understood that the embodiments shown in the drawings are not to limit the scope of the invention, but merely to illustrate the true spirit of the technical solutions of the present invention.

FIG. 1 is an exploded perspective view illustrating a valve with a hinged valve core 100 according to the first embodiment of the present invention. As shown in FIG. 1, the valve 100 comprises a valve body 1, an operating mechanism 2, a transmission member 3, a valve core 4, a valve cover 5, sealing rings 6 and 7, and a snap 8. The valve core 4 is connected to the valve body 1 through a hinge, and the hinge is constructed of hinge shafts provided on the valve core 4 and hinge holes provided on the valve body 1, which will be described in more detail hereinafter. The sealing ring 6 is arranged between the valve core 4 and the valve body 1. The valve core 4 is connected with the operating mechanism 2 via the transmission member 3, so that actions on the operating mechanism 2 can be transferred to the valve core 4 through the transmission member 3, thereby achieving opening/closing of the valve. The sealing ring 7 is arranged between the operating mechanism 2 and the valve body 1. The snap 8 is used to maintain the operating mechanism 2 on the valve body 1, so that the operating mechanism 2 would not be disengaged from the valve body 1 when assembled.

In addition, the valve 100 is also provided with a locking mechanism 9 used to keep the valve in an open or closed state. In the present embodiment, the locking mechanism 9 is constituted by corresponding structures provided on the operating mechanism 2, the valve body 1 and the valve core 4 respectively, which will be further described hereinafter.

Figure 2A:
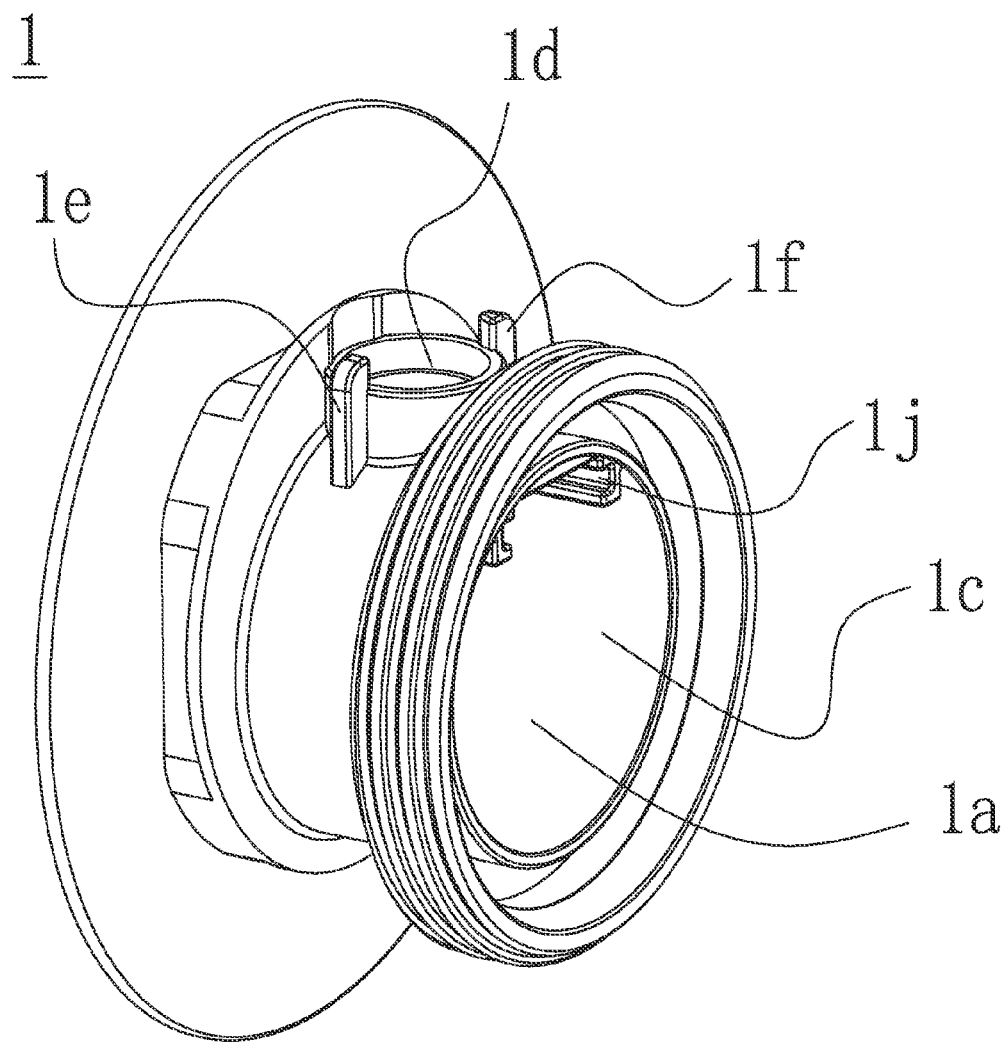
FIGS. 2a-2c are perspective views illustrating a valve body of the valve with a hinged valve core according to the first embodiment of the present invention.
Figure 2B:
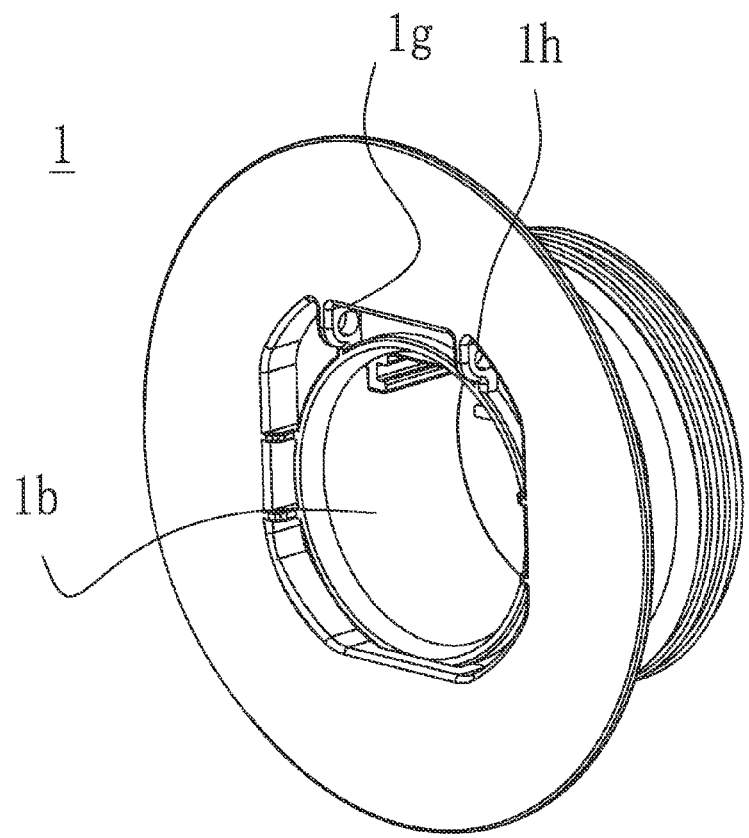
Figure 2C:
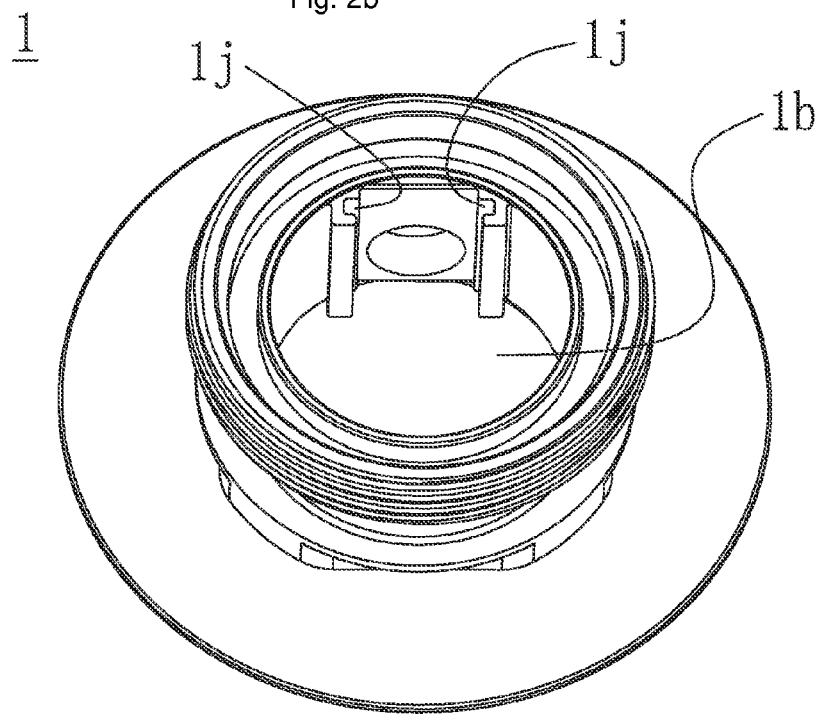

FIGS. 2a-2c are perspective views illustrating the valve body 1 of the valve with a hinged valve core 100 according to the first embodiment of the present invention. As shown in FIGS. 2a-2c, valve body 1 is a housing, in which formed a channel 1a allowing the passage of fluid. An inlet 1b communicated with a container and an outlet 1c communicated with external environment are respectively formed on the left and right ends of the housing and aligned with a horizontal axis (not shown). The valve core 4 is provided at the inlet 1b. The outlet 1c is connected with the valve cover. An operating hole (or referred as a valve stem hole) 1d is formed at the upper end of the valve body 1 which extends along a vertical axis (not shown) perpendicular to said horizontal axis. Positioning columns 1e and 1f are provided on an outer wall around the operating hole 1d. The hinge holes 1g and 1h are provided above the channel 1a at the inlet 1b of the valve body 1. Guiding grooves 1j, 1j extending along the horizontal axis are provided over the channel 1a.

Figure 3A:
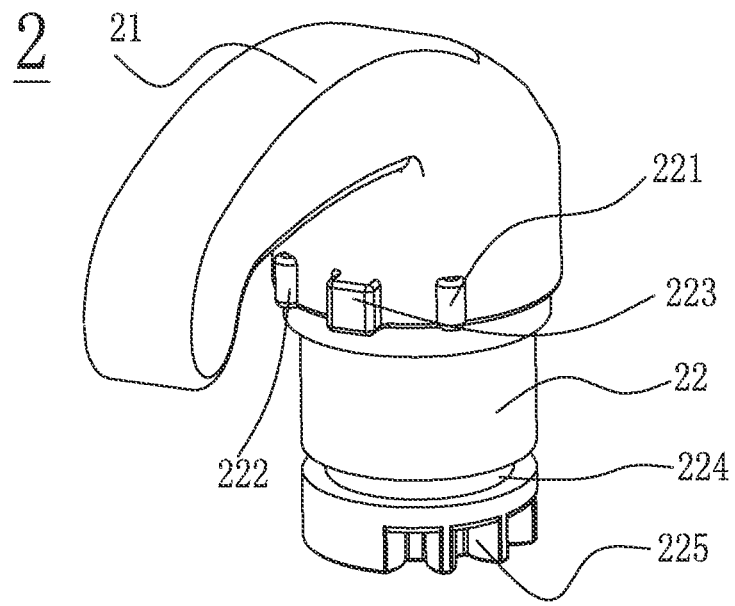
FIGS. 3a and 3b are perspective views illustrating an operating mechanism of the valve with a hinged valve core according to the first embodiment of the present invention.
Figure 3B:
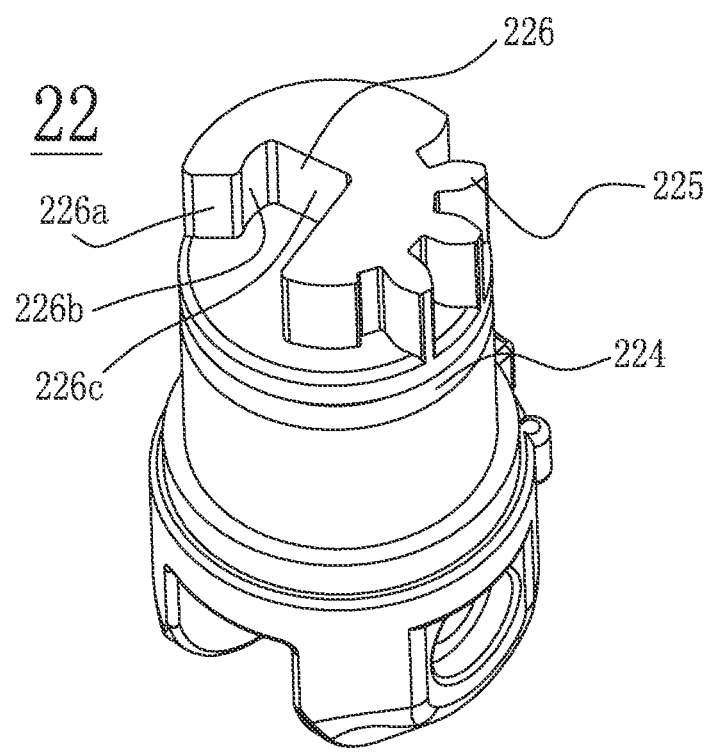

FIGS. 3a and 3b are perspective views illustrating the operating mechanism 2 of the valve 100, wherein a handle is omitted in FIG. 3b. As shown in FIGS. 3a and 3b, the operating mechanism 2 comprises a handle 21 and an operating member 22, and the handle 21 can be connected with the operating member 22 via a pin. The operating member 22 can be partially accommodated in the operating hole 1d to be engaged with the transmission member 3. The operating member 22 is substantially a cylinder. A stopping projection 221 and positioning ribs 222, 223 integrally project from the outer wall of the cylinder at the upper part thereof. The stopping projection 221 and positioning ribs 222, 223 are respectively engaged with the positioning columns 1e, 1f on the valve body 1, so as to keep the valve in an open state and prevent the operating member from rotating beyond a predetermined angle. A snapping slot 224 is provided on the outer peripheral wall near the lower end of the operating member 22, and is used to be engaged with the snap 8 so that the operating member is rotatably held on the valve body 1. A gear 225 and a locking hook 226 are integrally provided at the bottom end of the operating member 22, wherein the gear 225 is used to be engaged with a rack on the transmission member 3 to achieve motion-transferring. The locking hook 226 is used to maintain the valve core 4 in a stably closed state while the valve is closed. The locking hook 226 is a hook-shaped structure and comprises an initial portion 226a, an intermediate portion 226b and a terminal portion 226c, wherein the initial portion 226a is an inclined surface acting as a direction guide. The locking hook is used to be engaged with a locking pole provided on the valve core 4, so as to achieve locking when the valve is closed, which will be described in more detail hereinafter.

Figure 4A:
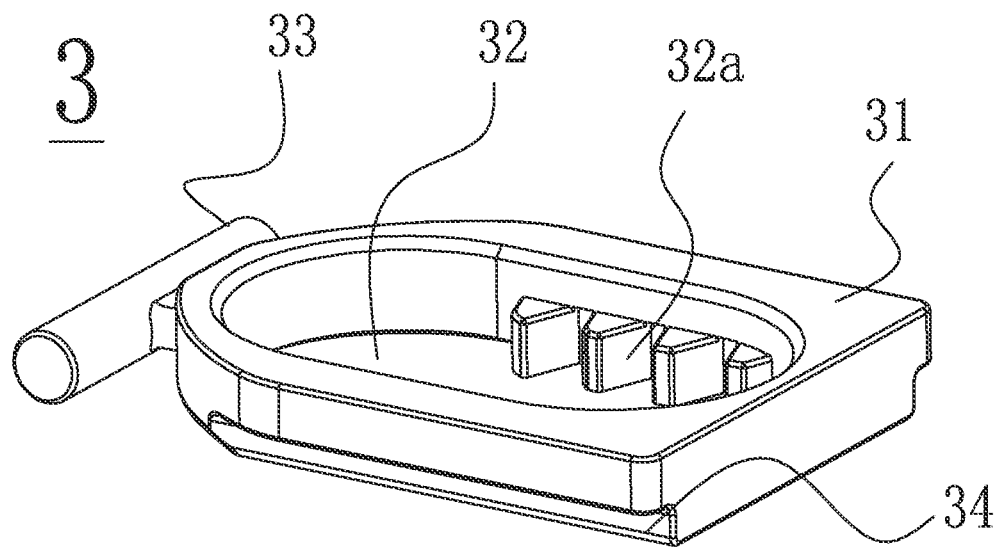
FIGS. 4a and 4b are perspective views illustrating a transmission member of the valve with a hinged valve core according to the first embodiment of the present invention.
Figure 4B:
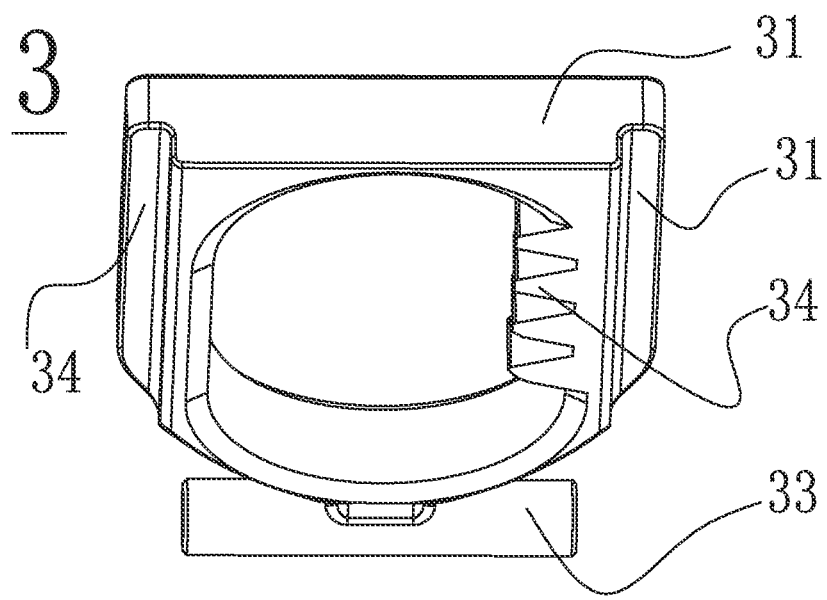

FIGS. 4a and 4b are perspective views illustrating the transmission member 3 of the valve 100. As shown in FIGS. 4a and 4b, the transmission member 3 is substantially a member having a plate-shaped body 31. A hole 32 is provided at the middle portion of the plate-shaped body 31, and a rack 32a is provided on one side wall surrounding the hole 32. The rack 32a is used to be engaged with the gear 225 of the operating member 22 to achieve motion-transferring between the operating member and the transmission member, as shown in FIG. 4c. One end of the plate-shaped body is provided with a driving rod 33. Sliding rails 34, 34 are provided at one side (the lower side as shown in FIG. 4a) of the plate-shaped body 31. Sliding rails 34 are engaged with the guiding grooves 1j on the valve body 1, so that the transmission member 3 is movable in the valve body 1 along a horizontal axis.

Figure 5A:
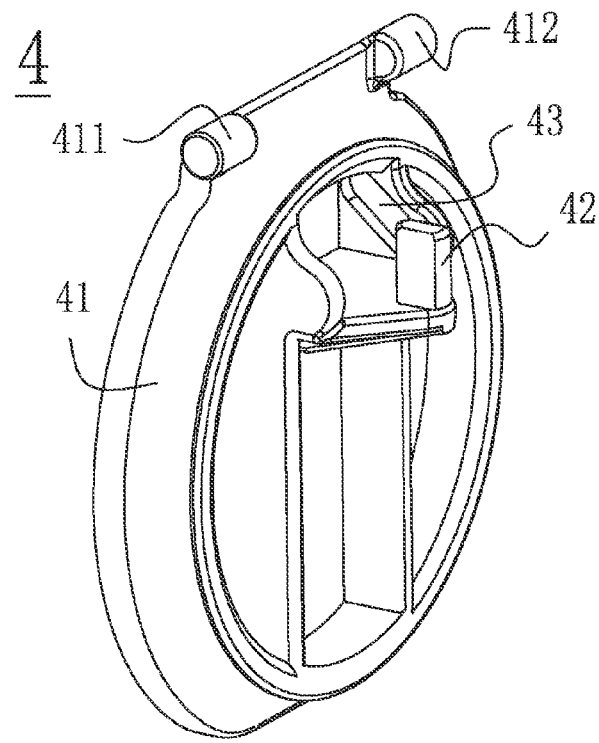
FIGS. 5a and 5b are perspective views illustrating a valve core of the valve with a hinged valve core according to the first embodiment of the present invention.
Figure 5B:
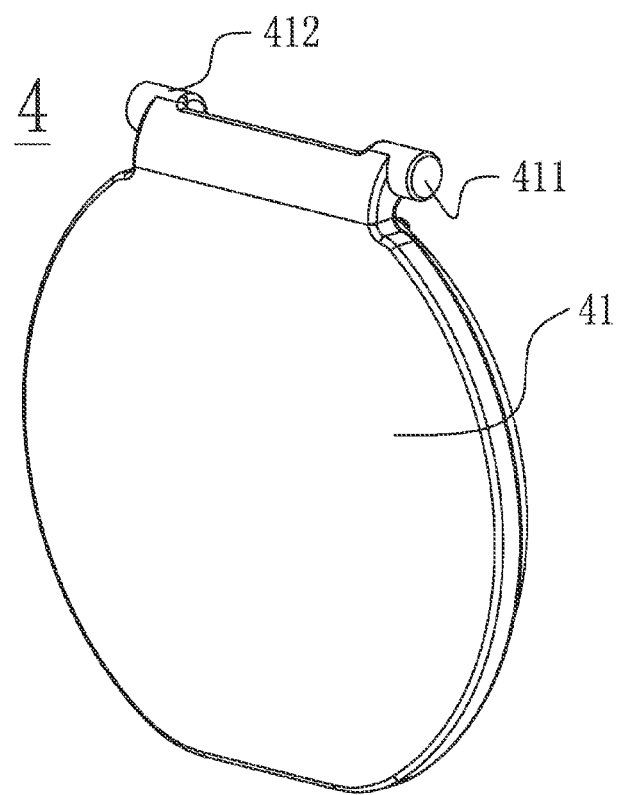
Figure 6:
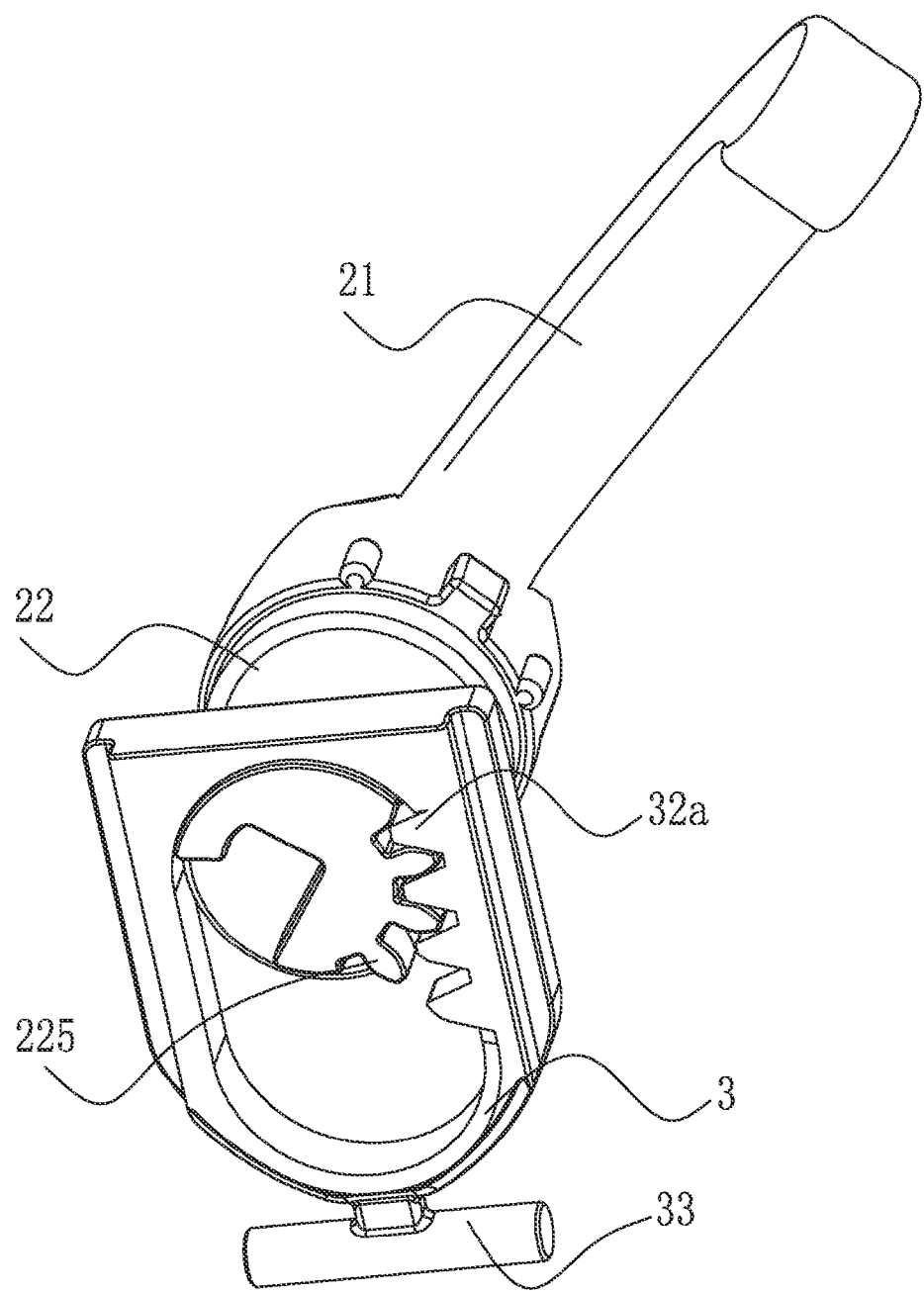
FIG. 6 is a sectional view illustrating a part of the valve with a hinged valve core according to the first embodiment when assembled and in an open state.

FIGS. 5a and 5b are perspective views illustrating the valve core 4 of the valve 100. As shown in FIGS. 5a and 5b, the valve core 4 has a disc-shaped body 41. Hinge shafts 411, 412 are integrally provided on the outer periphery of the body 41. One side of the body 41 is a smooth surface, while the other side is provided with a locking pole 42. A sliding slot 43 is provided between the locking pole 42 and the body 41. The sliding slot 43 is an elongated slot, and in the present embodiment, it is a kidney-shaped slot, as shown more clearly in FIG. 6. The locking pole 42 is used to be engaged with the locking hook 226 of the transmission member 22. When locked, the locking pole 42 and the locking hook 226 are in an interference fit. That is, during closing the valve: when the locking pole 42 contacts with the initial portion 226a of the locking hook 226, the initial portion 226a will apply an inward force on the locking pole 42 under the effect of the inclined surface of the initial portion 226a as the operating member 22 (valve stem) is further rotated; when the locking pole 42 is pulled to the intermediate portion 226b, a side surface of the locking pole 42 is engaged with the terminal portion 226c of the locking hook 226. At this point, the sealing ring 6 is compressed so as to achieve sealing. Then, the valve is tightly closed and locked.

Figure 7:
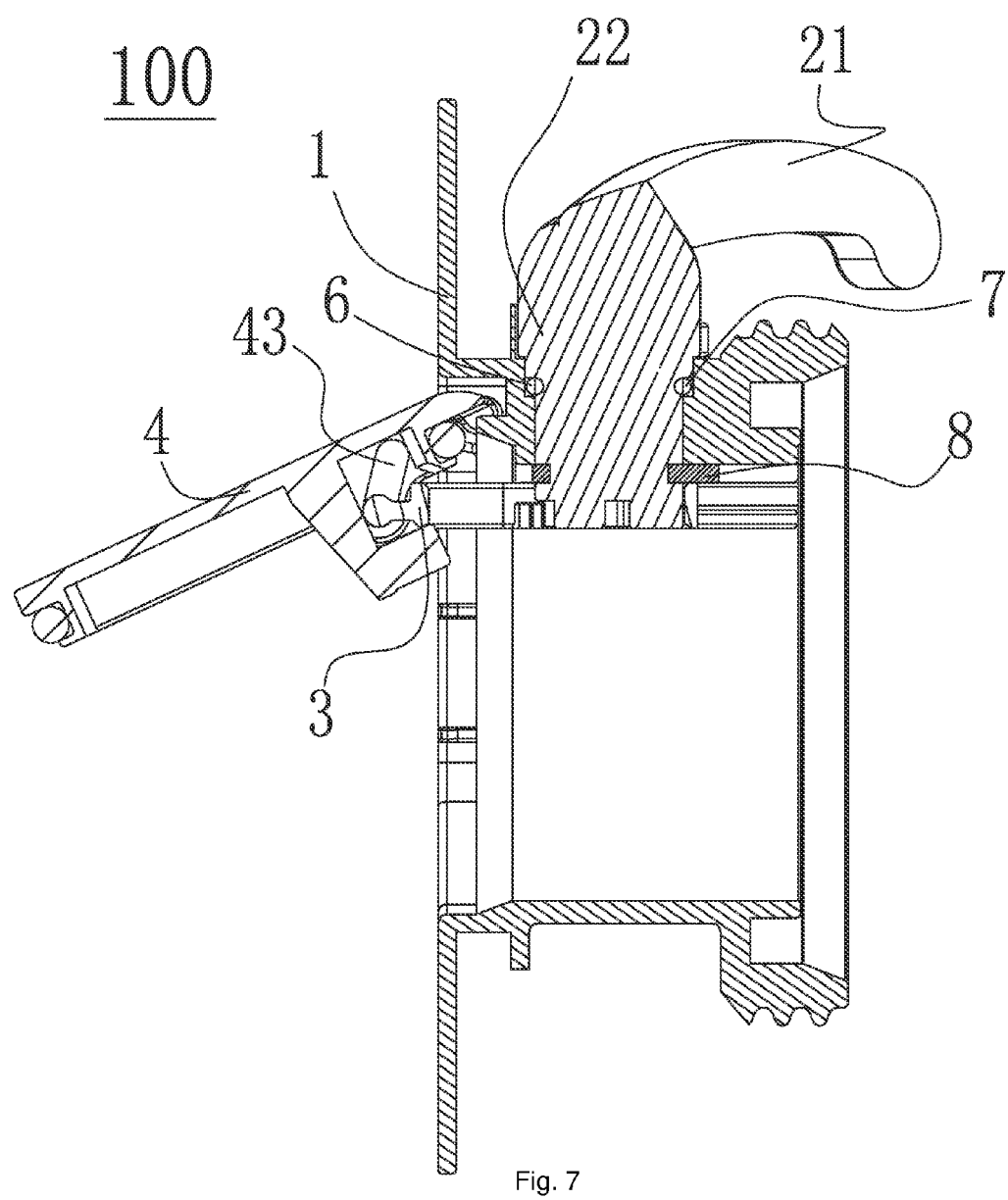
FIGS. 7, 8a and 8b are cross-sectional views illustrating the process of closing the valve with a hinged valve core according to the first embodiment of the present invention.

FIG. 7 is a sectional view illustrating the assembled valve 100 in an open state. As shown in FIG. 7, the operating member 22 is partially accommodated in the operating hole of the valve body 1 and rotatably held on the valve body 1 through the snap 8. The hinge shafts 411 and 412 on the valve core 4 are respectively inserted in the hinge holes 1g and 1h on the valve body 1, so that the valve core is rotatable around a central axis of the hinge holes. The transmission member 3 is installed in the guiding grooves 1j of the valve body 1 and is slidable along the guiding grooves 1j. The driving rod 33 of the transmission member 3 is received in the sliding slot 43 of the valve core 4. The rack 32a of the transmission member 3 is engaged with the gear 225 of the operating member 22, so that when the operating member 22 is rotated, the transmission member 3 will slide along the guiding grooves under the engagement between the gear and the rack, and the driving rod 33 provided on the transmission member will slide along the sliding slot 43, thereby opening or closing the valve core.

Figure 8A:
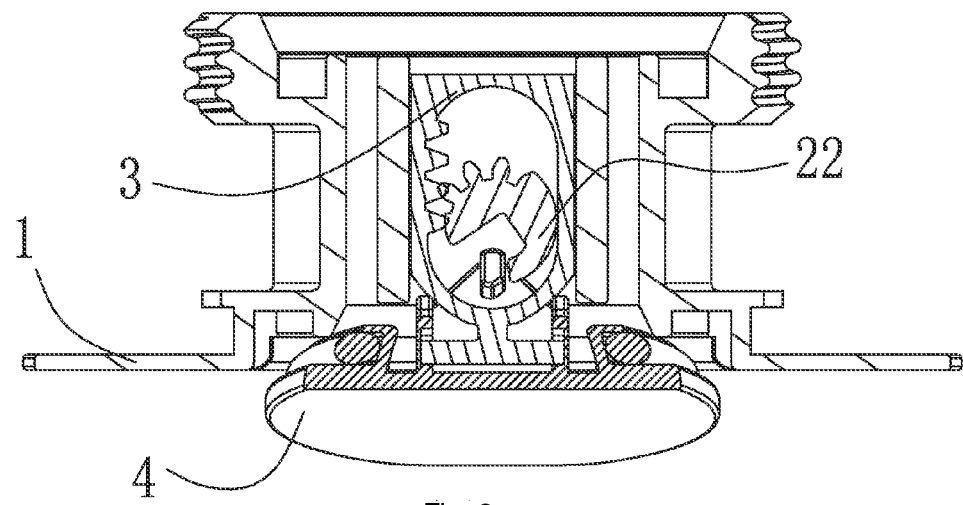
Figure 8B:
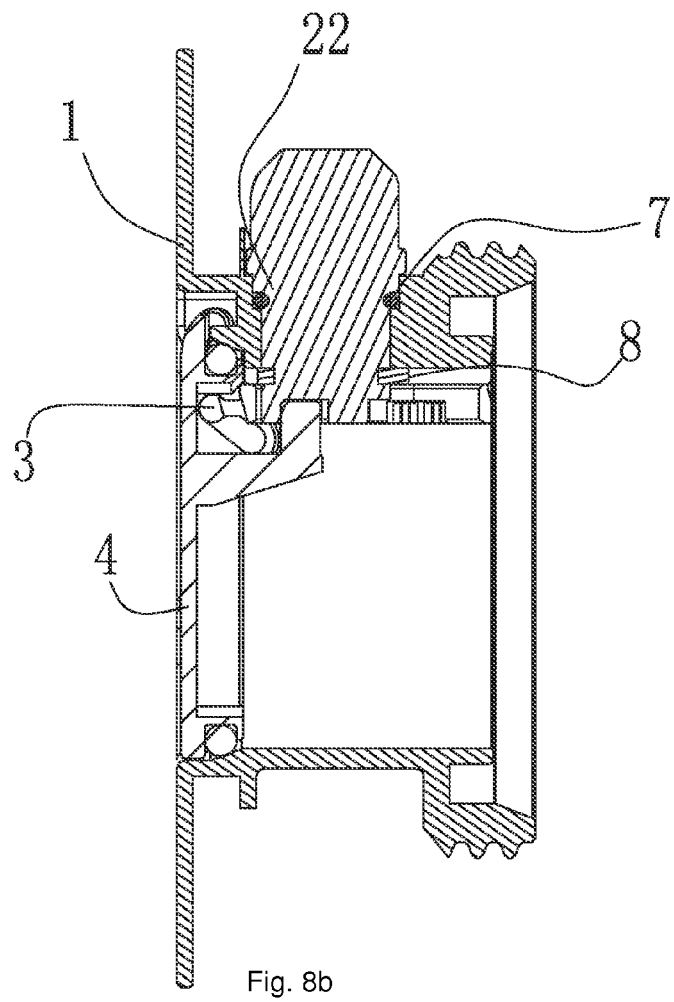

When closing the valve, as shown in FIGS. 7, 8a and 8b, the operating member 22 being rotated, the valve core 4 is moved toward the valve body 1, and the locking pole 42 on the valve core 4 contacts with the locking hook 226 of the operating member 22. When the engagement between the gear 225 of the operating member 22 and the rack 32a of the transmission member 3 is released, the locking hook of the operating mechanism is engaged with the locking pole of the valve core to form a locking device. When the operating member is further rotated, the locking hook is gradually locked tightly to the locking pole, thereby achieving tight closure of the valve.

When opening the valve, the operating member 22 being rotated reversely, the locking hook of the locking device will firstly be disengaged from the locking pole of the valve core. When the operating member is further rotated, the gear of the operating member is engaged with the rack of the transmission member. Then, the transmission member 3 will slide along the guiding grooves of the valve body 1 towards the valve core and push the valve core under the engagement of the gear with the rack and when driven by the operating member, thereby opening the valve. When the valve core is fully opened, the valve will be maintained in an open state through the engagement of ribs provided on the operating member with the positioning column of the valve body.

In the above embodiment, since the valve core is connected with the valve body via a hinge, the valve core can be rotated around the central axis of the hinge to achieve opening/closing of the valve. When opened, there is no stopping member in the fluid channel of the valve body, which allows a large flow. Besides, adopting a hinge connecting means provides a valve with simple, compact structure and a low manufacturing cost.

Figure 9:
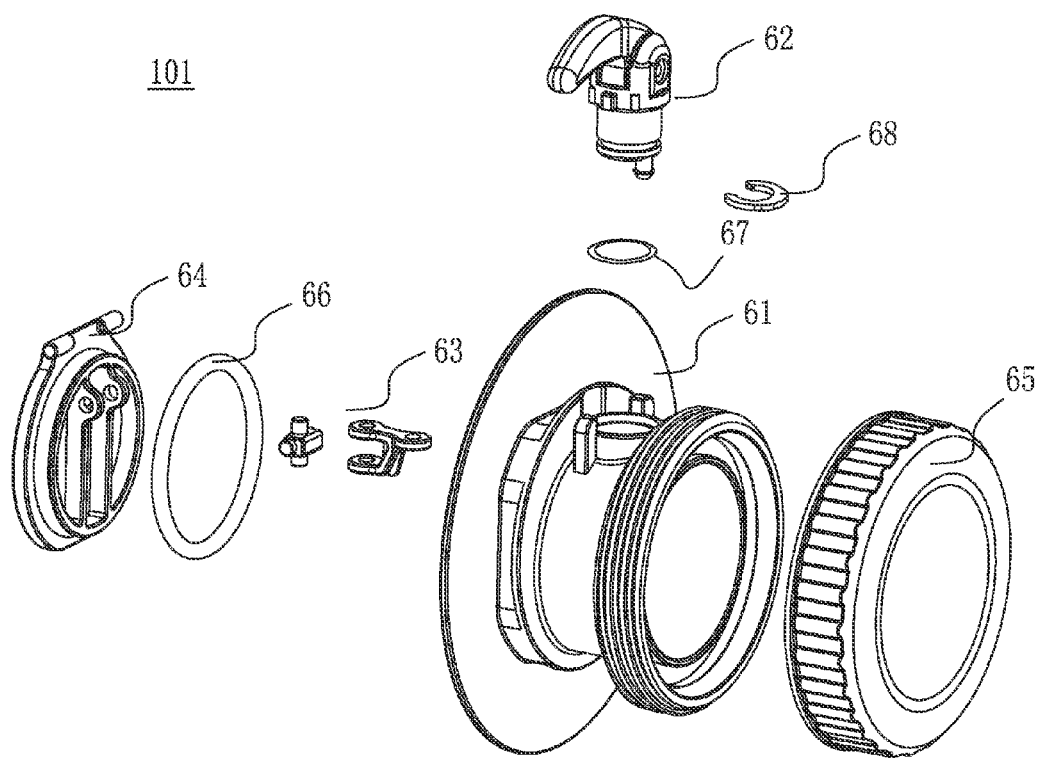
FIG. 9 is an exploded perspective view illustrating a valve with a hinged valve core according to the second embodiment of the present invention.

FIG. 9 is an exploded perspective view illustrating a valve with a hinged valve core 101 according to the second embodiment of the present invention. As shown in FIG. 9, the valve 101 comprises a valve body 61, an operating mechanism 62, a motion-transferring device 63, a valve core 64, a valve cover 65, sealing rings 66, 67 and a snap 68. The valve core 64 is connected with the valve body 61 through a hinge. The hinge is constructed of hinge shafts provided on the valve core 64 and hinge holes provided on the valve body 61, which will be described in more detail hereinafter. The sealing ring 66 is arranged between the valve core 64 and the valve body 61. The valve core 64 is connected with the operating mechanism 62 via the motion-transferring device 63, so that actions on the operating mechanism 62 can be transferred to the valve core 64 through the motion-transferring device 63, thereby achieving opening/closing of the valve. The sealing ring 67 is arranged between the operating mechanism 62 and the valve body 61. The snap 68 is used to maintain the operating mechanism 62 on the valve body 61, so that the operating mechanism 62 would not be disengaged from the valve body 61 when assembled.

In addition, the valve 101 is also provided with a locking mechanism 69 used to keep the valve in an open or closed state. In the present embodiment, the locking mechanism 69 is constituted by corresponding structures provided on the operating mechanism 62, the valve body 61 and the valve core 64 respectively, which will be further described hereinafter.

Figure 10A:
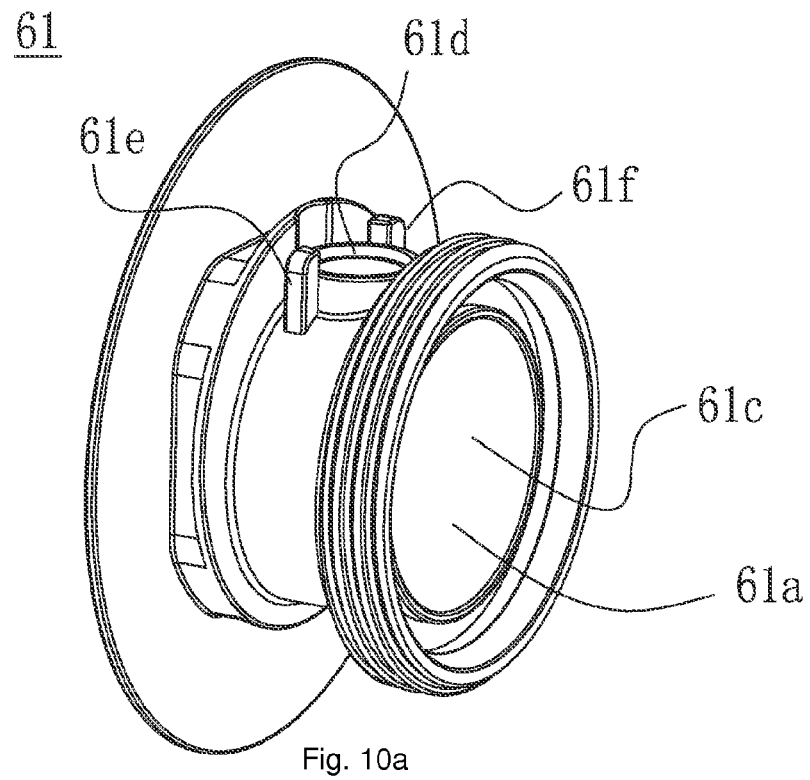
FIGS. 10a-10b are perspective views illustrating a valve body of the valve with a hinged valve core according to the second embodiment of the present invention.
Figure 10B:
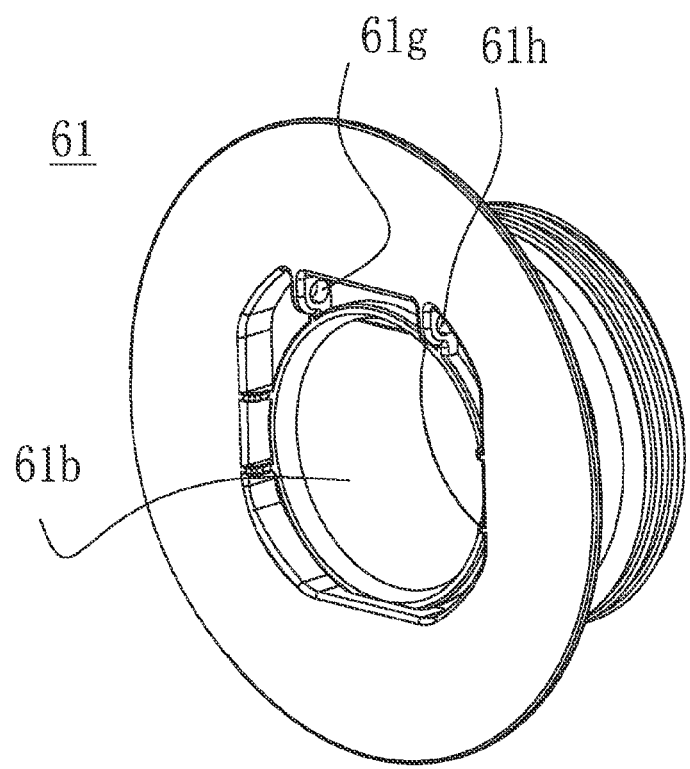

FIGS. 10a-10b are perspective views illustrating the valve body 61 of the valve 101 according to the second embodiment of the present invention. As shown in FIGS. 10a-10b, the valve body 61 is a housing, in which formed a channel 61a allowing the passage of fluid. An inlet 61b communicated with a container and an outlet 61c communicated with external environment are respectively formed on the left and right ends of the housing and aligned with a horizontal axis (not shown). The valve core 64 is provided at the inlet 61b. The outlet 61c is connected with the valve cover. An operating hole (or referred as a valve stem hole) 61d is formed at the upper end of the valve body 61 which extends along a vertical axis (not shown) perpendicular to said horizontal axis. Positioning columns 61e and 61f are provided on the outer wall around the operating hole 61d. The hinge holes 61g and 61h are provided above the channel 61a at the inlet 61b of the valve body 61.

Figure 11:
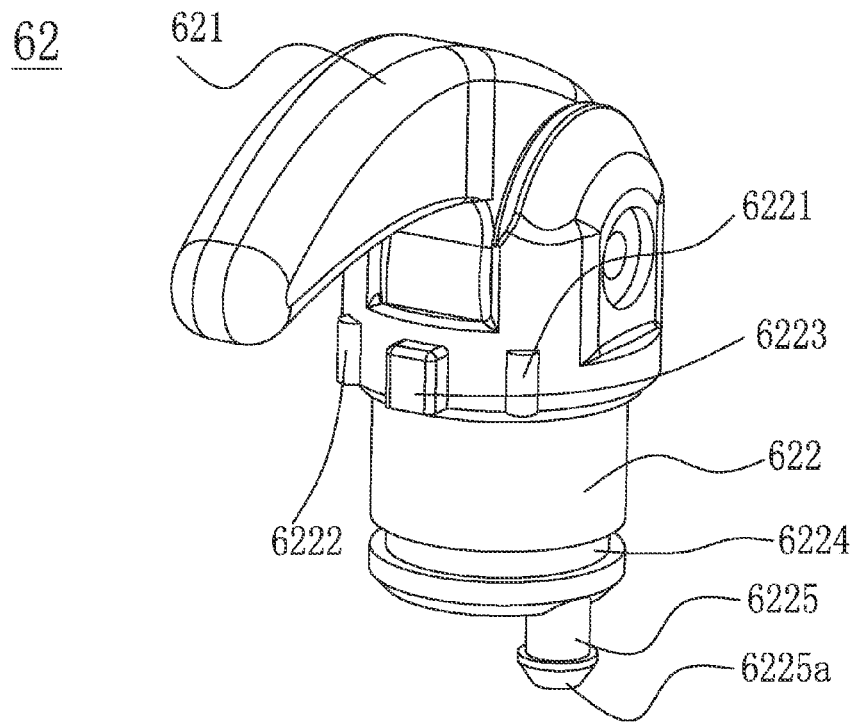
FIG. 11 is a perspective view illustrating an operating mechanism of the second embodiment of the valve with a hinged valve core of the present invention.

FIG. 11 is a perspective view illustrating an operating mechanism 62 of the valve 101. As shown in FIG. 11, the operating mechanism 62 comprises a handle 621 and an operating member 622, and the handle 621 can be connected with the operating member 622 via a pin. The operating member 622 can be partially accommodated in the operating hole 61d to be engaged with the motion-transferring device 63. The operating member 622 is substantially a cylinder. A stopping projection 6221 and positioning ribs 6222, 6223 integrally project from the outer wall of the cylinder at the upper part thereof. The stopping projection 6221 and positioning ribs 6222, 6223 are respectively engaged with the positioning columns 61e, 61f on the valve body 61, so as to keep the valve in an open state and prevent the operating member from rotating beyond a predetermined angle. A snapping slot 6224 is provided on the outer peripheral wall near the lower end of the operating member 622, and is used to be engaged with the snap 68 so that the operating member is rotatably held on the valve body 61. A driving column 6225 integrally projects from the bottom of the operating member 622. The driving column 6225 is used to be engaged with a driving hole provided on the motion-transferring device 63 to achieve motion-transferring. A step 6225a is formed at the end of the driving column 6225, so that the driving column is rotatably maintained in the driving hole of the motion-transferring device without running out when assembled. The central axis of the driving column 6225 deviates a distance from the central axis of the operating member 22, thereby the driving column 6225 and the motion-transferring device 63 form an eccentric cam mechanism together.

Figure 12A:
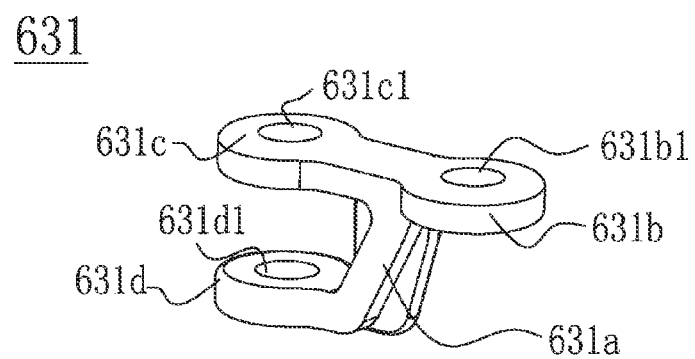
FIGS. 12a and 12b are perspective views illustrating a transmission member of the valve with a hinged valve core according to the second embodiment of the present invention.
Figure 12B:
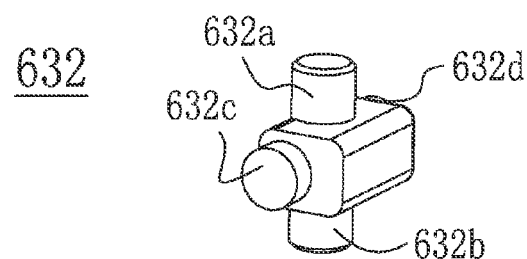

FIGS. 12a and 12b are perspective views illustrating the motion-transferring device 62 of the valve 101 of the present invention. As shown in FIGS. 12a and 12b, the motion-transferring device 62 is constituted by a transmission member 631 and a cross member 632, wherein the transmission member 631 has a body 631a. A lug 631b is projected from one end of the body 631a. The lug is provided with a driving hole 631b1. Two parallel lugs 631c, 631d are projected from the other end of the body 631a. Coaxial driving holes 631c1 and 631d1 are respectively provided on said two parallel lugs.

The cross member 632 is constituted by two rotating columns 632a, 632b in the vertical direction and two transmission columns 632c, 632d in the horizontal direction. The rotating columns 632a, 632b are used to be engaged with driving holes 631c1, 631d1 of the transmission member respectively, and the two transmission columns are used to be engaged with opening/closing holes provided on the valve core respectively.

Figure 13:
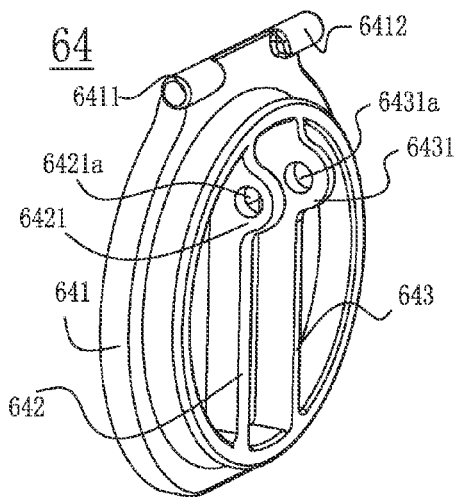
FIG. 13 is a perspective view illustrating a valve core of the valve with a hinged valve core according to the second embodiment of the present invention.

FIG. 13 is a perspective view illustrating the valve core 64 of the valve 101. As shown in FIG. 13, the valve core 64 has a disc-shaped body 641, and hinge shafts 6411, 6412 are integrally provided on the outer periphery of the body 641. One side of the body 641 is a smooth surface, while the other side is provided with two parallel ribs 642, 643. The upper portions of the ribs 642, 643 are respectively provided with two lugs 6421, 6431, and the two lugs are respectively provided with the opening/closing holes 6421a, 6431a.

Figure 14:
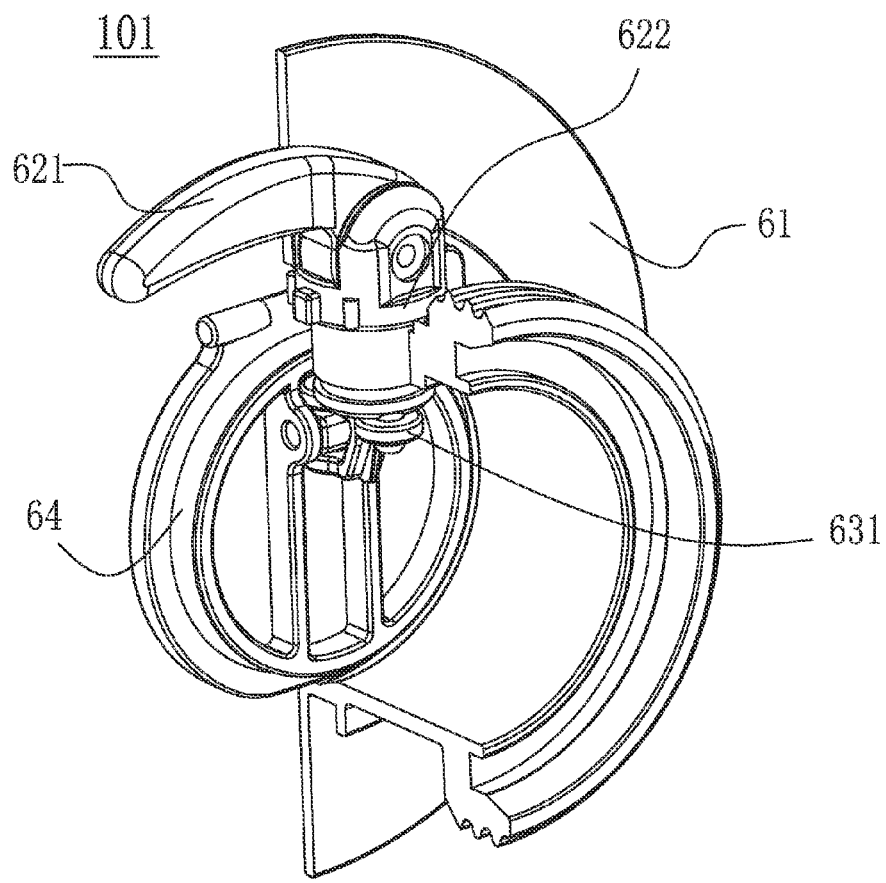
FIG. 14 is a perspective view illustrating the valve according to the second embodiment when assembled and in a closed state, which is partially cut away to illustrate its internal structure.

FIG. 14 is a perspective view illustrating the valve 101 when assembled and in a closed state, which is partially cut away to illustrate its internal structure. As shown in FIG. 14, the operating member 622 is partially accommodated in the operating hole of the valve body 61 and rotatably held on the valve body 61 through the snap 68. The driving column 6225 of the operating member 622 is inserted into the driving hole 631b1 of the transmission member 631. Two rotating columns 632a, 632b of the cross member are respectively inserted into the driving holes 631c1, 631d1 of the transmission member 321. Two transmission columns 632c, 632d of the cross member are respectively inserted into the opening/closing holes 6421a, 6431a of the valve core 64. The transmission member, the cross member and the valve core form a universal joint structure together, so that the motion-transferring device can be freely controlled by the operating mechanism without stuck due to the rotation of the valve core during the opening/closing process of the valve. The hinge shafts 6411, 6412 of the valve core 64 are respectively inserted into the hinge holes 61g, 61h of the valve body 61, so that the valve core can be rotated around the central axis of the hinge holes.

Figure 15:
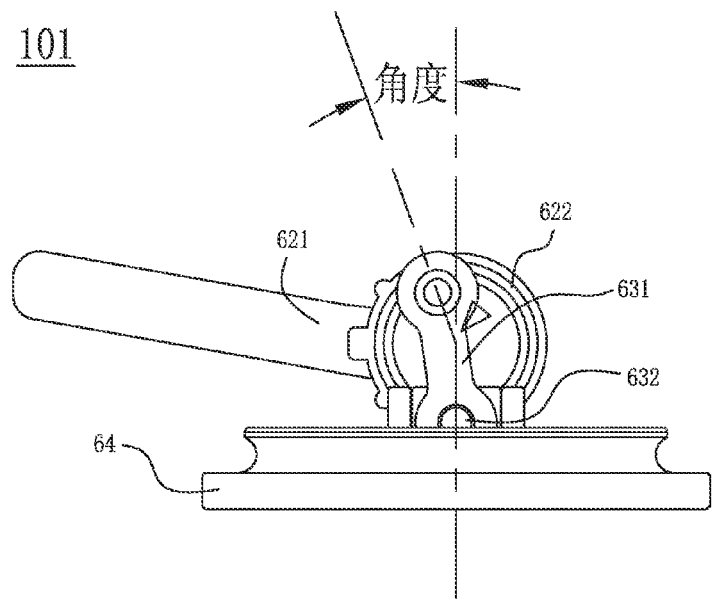
FIG. 15 is a schematic view illustrating the valve with a hinged valve core according to the second embodiment of the present invention when closed.

When closing the valve, as shown in FIG. 15, driven by the operating mechanism, the motion-transferring device pulls the valve core to move toward the valve body. When the handle is rotated to be substantially parallel to the valve core, the valve is closed. Then, the handle (operating mechanism) is further rotated so that the stopping projection of the operating mechanism is engaged with the positioning column of the valve body. At this point, the valve core maintains at a standstill (eccentric locking) due to a rebounding force applied by the sealing ring 66 and combined effect of the stopping projection and the positioning column, thereby tightly closing the valve.

Figure 16:
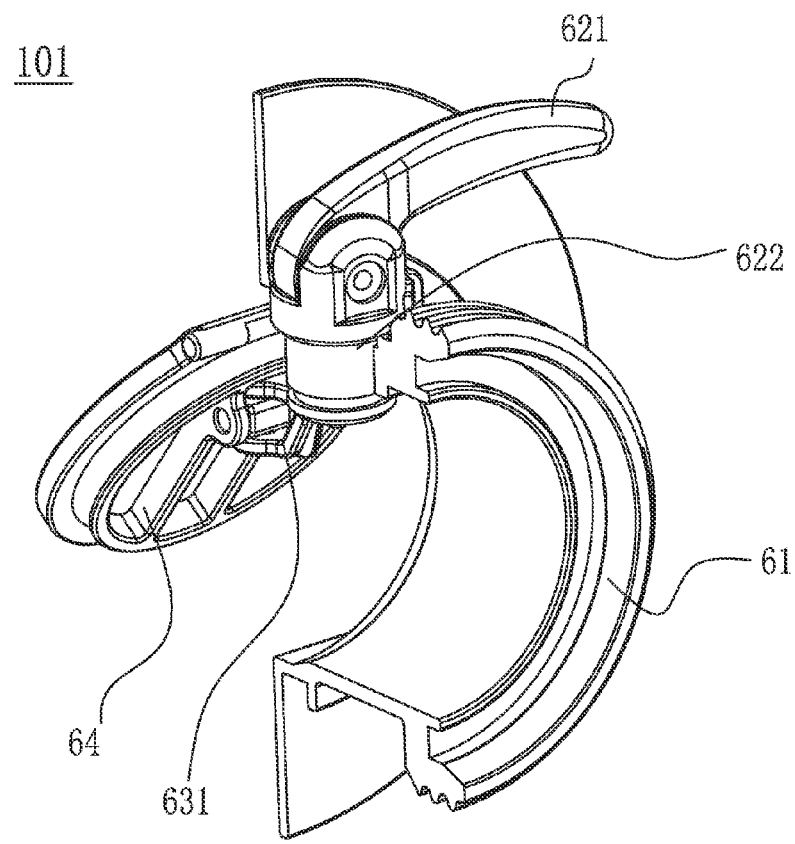
FIG. 16 is a perspective view illustrating the valve according to the second embodiment when assembled and in an open state, which is partially cut away to illustrate its internal structure.

When opening the valve, as shown in FIG. 16, the handle being rotated reversely, the valve core is pushed by the motion-transferring device driven by the operating mechanism, thereby opening the valve. When the valve core is fully opened, the valve will be maintained in an open state through the engagement of ribs provided on the operating member with the positioning column of the valve body.

Figure 17:
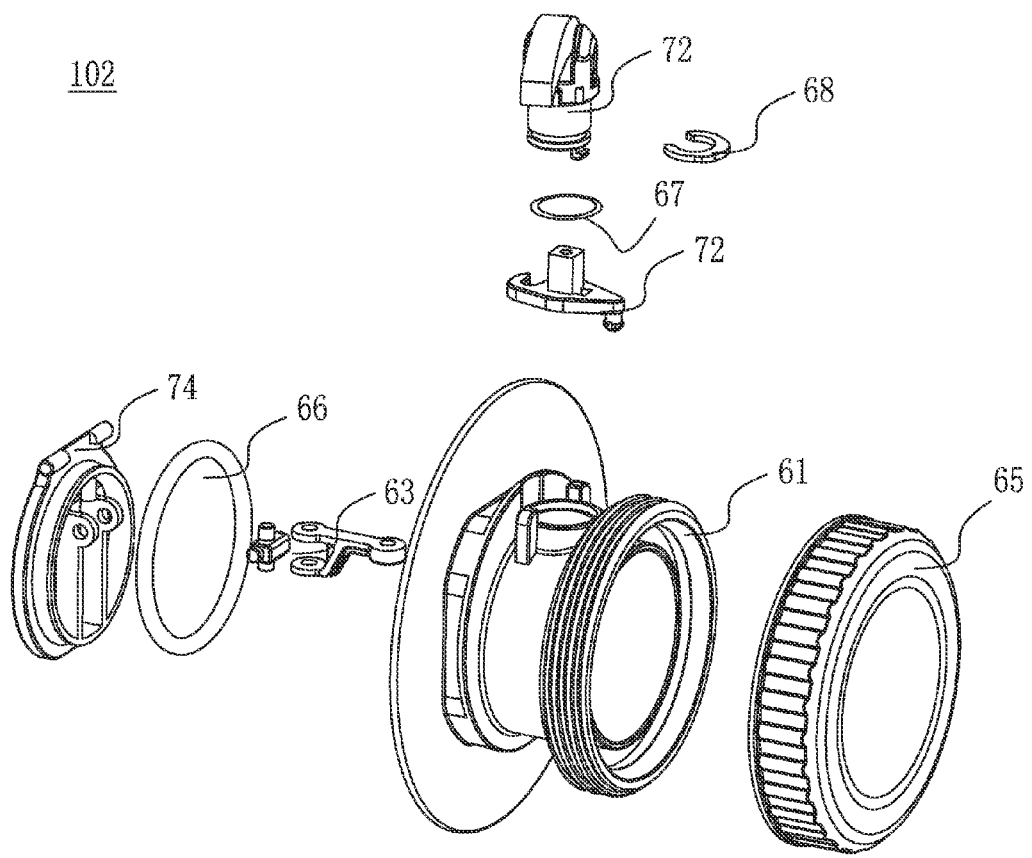
FIG. 17 is an exploded perspective view illustrating a valve with a hinged valve core according to the third embodiment of the present invention.

FIG. 17 is an exploded perspective view illustrating the valve with a hinged valve core 102 according to the third embodiment of the present invention. As shown in FIG. 17, the valve 101 comprises a valve body 61, an operating mechanism 72, a motion-transferring device 63, a valve core 74, a valve cover 65, sealing rings 66, 67, and a snap 68. The valve core 74 is connected with the valve body 61 through a hinge, and the hinge is constructed of hinge shafts provided on the valve core 74 and hinge holes provided on the valve body 61, which will be described in more detail hereinafter. The sealing ring 66 is arranged between the valve core 74 and the valve body 61. The valve core 64 is connected with the operating mechanism 62 via the motion-transferring device 63, so that actions on the operating mechanism 72 can be transferred to the valve core 64 through the motion-transferring device 63, thereby opening/closing the valve. The sealing ring 67 is arranged between the operating mechanism 72 and the valve body 71. The snap 68 is used to maintain the operating mechanism 72 on the valve body 61, so that the operating mechanism 72 would not be disengaged from the valve body 61 when assembled.

The present embodiment is the same as the second embodiment except the structures of the operating mechanism 72 and the valve core 74. Therefore, the same parts will not be described here.

Figure 18:
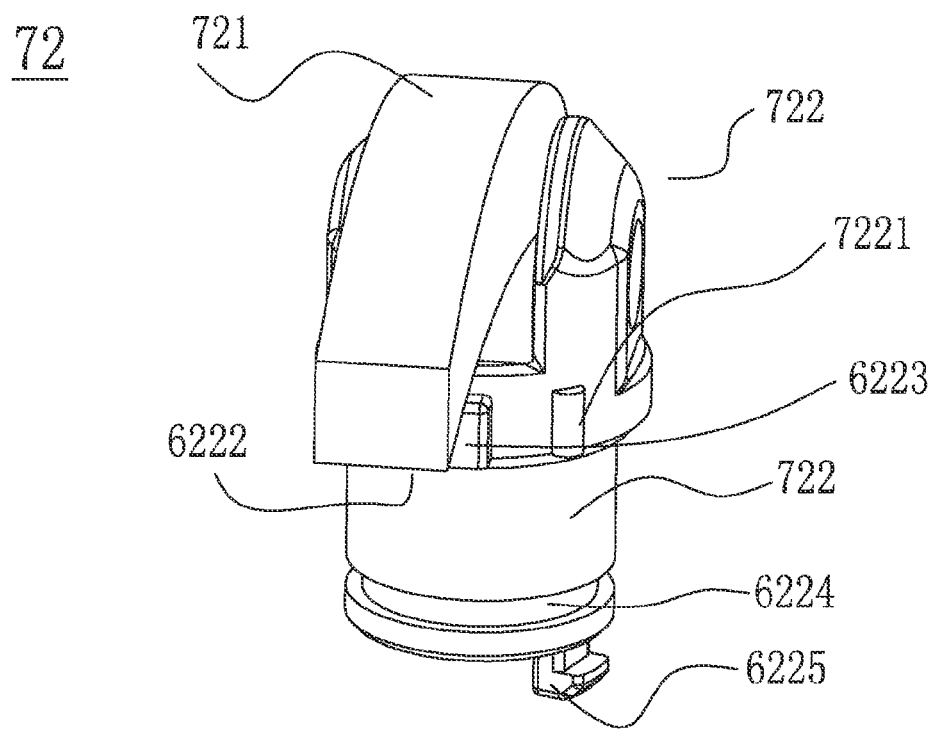
FIG. 18 is an exploded perspective view illustrating an operating mechanism of the valve with a hinged valve core according to the third embodiment of the present invention.
Figure 18:
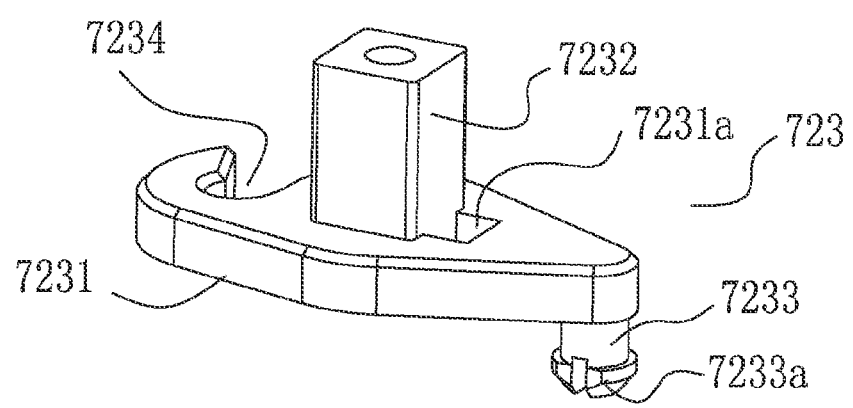

FIG. 18 illustrates the operating mechanism 72 of the present embodiment. As shown in FIG. 18, the operating mechanism 72 is constituted by a handle 721, an operating member 722 and a locking member 723. The handle 721 is connected with the operating member 722 via a pin. The operating member 722 can be partially accommodated in the operating hole 61d of the valve body to be engaged with the transmission member 63. The operating member 722 is substantially a cylinder. A stopping projection 7221 and positioning ribs 7222, 7223 integrally project from the outer wall of the cylinder at the upper part thereof. The stopping projection 7221 and positioning ribs 7222, 7223 are respectively engaged with the positioning columns 61e, 61f of the valve body 61, so as to keep the valve in an open state and prevent the operating member from rotating beyond a predetermined angle. A snapping slot 7224 is provided on the outer peripheral wall near the lower end of the operating member 722, and is used to be engaged with the snap 68 so that the operating member is rotatably held on the valve body 61. An anti-off buckle 7225 is integrally projected from the bottom end of the operating member 722 and is used to be engaged with the anti-off hole on the locking member 723, so as to prevent disengagement of the operating member 722 and the locking member 723 after connection. In addition, the operating member is also provided with a positioning hole (not shown) used to receive the positioning column provided on the locking member.

The locking member 723 has a plate-shaped body 7231, and the plate-shaped body is provided with an anti-off hole 7231a. A positioning column 7232 integrally extends from the upper surface of the plate-shaped body. A driving column 7233 integrally extends from the lower surface of the plate-shaped body. A step 7223a is provided on the end of the driving column 7233, so that the driving column is rotatably maintained in the driving hole of the motion-transferring device without disengagement when assembled. The other end of the plate-shaped body 7231 is provided with a locking hook 7234, which is used to be engaged with the locking pole of the valve core to lock the valve tightly when the valve is closed.

Figure 19:
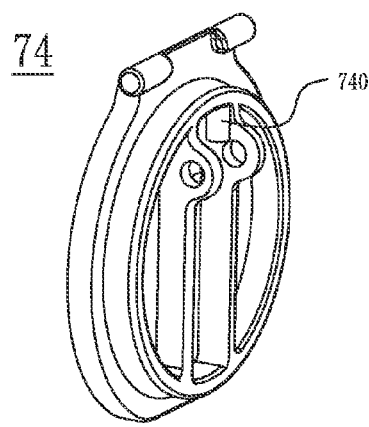
FIG. 19 is an perspective view illustrating a valve core of the valve with a hinged valve core according to the third embodiment of the present invention.

FIG. 19 illustrates the valve core 74 of the present embodiment. The valve core 74 is the same as the valve core 64 of the second embodiment except a locking pole 740 provided between the two parallel ribs, wherein other portions will not be described here. The locking pole 740 can be any columnar structure that can be engaged with the locking hook 7234 provided on the locking member 723, and in the present embodiment, the locking pole 740 is a cylinder.

The locking member 723 is fixedly connected with the operating member 722 through the positioning column 7232 and the anti-off hole 7231a, while the locking member is rotatably connected with the transmission member through the driving column 7233 when assembled. Other technical features are the same as those of the second embodiment, which will not be elaborated here.

Figure 20:
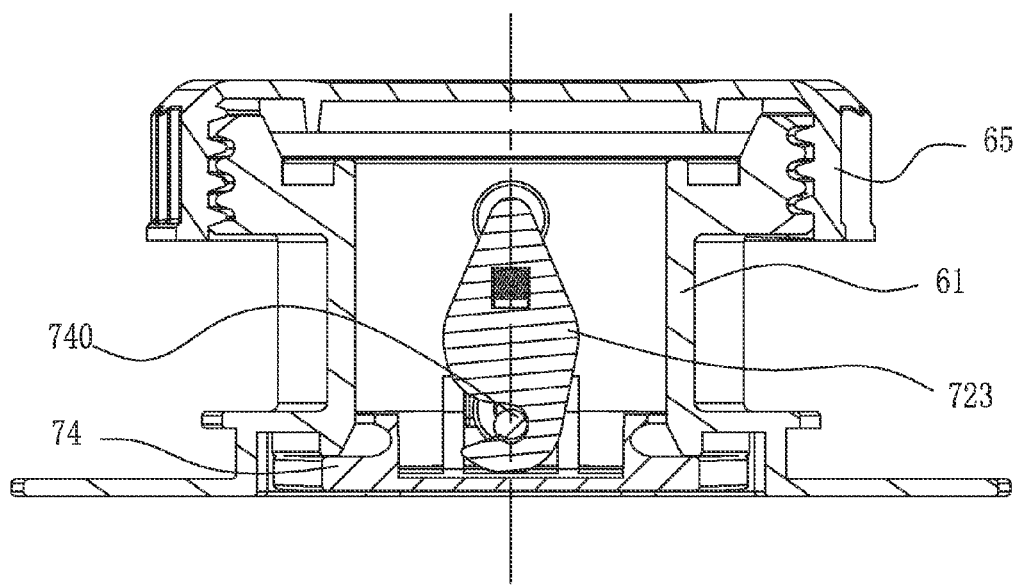
FIG. 20 is a cross-sectional view illustrating the valve with a hinged valve core according to the third embodiment of the present invention in a closed state.

When closing the valve, as shown in FIG. 20, the handle being rotated, the motion-transferring device is driven by the operating mechanism and pulls the valve core to move toward the valve body. When the valve core is rotated to a position where the valve is closed, the locking hook is engaged with the locking pole. When the operating mechanism is further rotated, the locking hook will be tightly locked with the locking pole gradually, thereby tightly closing the valve.

When opening the valve, the handle being rotated reversely, the valve core is pushed and opened by the motion-transferring device driven by the operating mechanism, thereby opening the valve. When the valve core is fully opened, the ribs on the operating member are engaged with the positioning columns of the valve body, thereby maintaining the valve in an open state.

In the valve of present invention, since the valve core is connected with the valve body via a hinge, the valve core can be rotated around the central axis of the hinge to achieve opening/closing of the valve. When opened, there is no stopping member in the fluid channel of the valve body, which allows a large flow. Besides, the valve can be opened efficiently by setting motion-transferring ration between the operating mechanism and the motion-transferring device. For example, the valve can be fully opened and closed with the operating mechanism being rotated by merely a small angle. Further, adopting a hinge connecting manner provides a valve with simple, compact structure and a low manufacturing cost, being easy to operate, as well as requiring a small torque for opening/closing.

Preferred embodiments of the present invention has been described in detail hereinbefore, but it is to be understood that, after reading the above teachings of the present invention, those skilled in the art may make various modifications or amendments to the present invention. These equivalent forms also fall into the scope limited by appended claims of the present application.

What is claimed is:

1. A valve with a hinged valve core, comprising:
a valve body, a valve core, an operating mechanism, a motion-transferring device, and a locking device, the valve body is a housing, wherein the housing is formed with an operating hole used to partially accommodate the operating mechanism and a channel having an inlet and an outlet is formed in the housing, wherein:
the valve core is connected with the valve body through a hinge constructed of hinge shafts provided on the valve core and hinge holes provided at the inlet of the channel of the valve body, and the valve core has a disc-shaped body and an outer periphery of the disc-shaped body is integrally provided with the hinge shafts;
and the operating mechanism is used to operate the valve core to be rotated around a central axis of the hinge to open/close the valve and the central axis of the hinge is on the outer periphery of the disc-shaped body or outside of the outer periphery of the disc-shaped body, so that the valve core is opened outwardly from the valve body and located outside of the valve body after the valve is opened, wherein the operating mechanism comprises a handle and an operating member, wherein the operating member is rotatably held on the valve body and will not be able to move in the direction perpendicular to the direction of flow; and
the motion-transferring device is used to transfer actions on the operating mechanism to the valve core, wherein the operating mechanism and the motion-transferring device form an eccentric cam mechanism together and the motion-transferring device is driven by the operating mechanism through the eccentric cam mechanism, and when the valve is closed or opened, the valve core is locked on the valve body through the locking device.

2. The valve according to claim 1, wherein
the operating mechanism is provided with stopping projection and positioning ribs,
the valve body is provided with positioning columns, and
the stopping projections and the positioning ribs are engaged with the positioning columns so that the valve is maintained in an open/closed state.

3. The valve according to claim 1, wherein:
guiding grooves are provided over the channel of the valve body;
the bottom of the operating member is provided with a gear and a locking hook;
the motion-transferring device is a plate-shaped member having a plate-shaped body, wherein a hole is provided at the middle portion of the plate-shaped body and a rack is provided on one sidewall surrounding the hole, the rack being used to be engaged with the gear provided on the operating member to achieve motion-transferring between the operating member and the motion-transferring mechanism; one end of the plate-shaped body is provided with a driving rod; and one side of the plate-shaped body is provided with sliding rails, wherein the sliding rails are engaged with the guiding grooves provided on the valve body, so that the motion-transferring mechanism is movable in the valve body along the guiding grooves; and the valve core has a disc-shaped body, wherein the outer periphery of the body is integrally provided with the hinge shafts; one side of the body is a smooth surface, and the other side is provided with a locking pole; wherein a sliding slot is provided between the locking pole and the body, and wherein the locking pole is used to be engaged with the locking hook of the motion-transferring device, and the sliding slot is used to be engaged with the driving rod of the motion-transferring device to open/close the valve.

4. The valve according to claim 3, wherein the locking hook comprises an initial portion, an intermediate portion, and a terminal portion, wherein the initial portion is an inclined surface acting as a direction guide, and the locking hook is used to be engaged with a locking pole provided on the valve core, so that during closing the valve, when the locking pole contacts with the initial portion of the locking hook, the initial portion will apply an inward force on the locking pole under the effect of the inclined surface as the operating member is further rotated, and when the locking pole is pulled to the intermediate portion, a side surface of the locking pole is engaged with the terminal portion of the locking hook, and the valve is tightly closed and locked at this point.

5. The valve according to claim 3, wherein the sliding slot is an elongated slot.

6. The valve according to claim 1, wherein:
a driving column integrally projects from the bottom of the operating member and is used to be engaged with the motion-transferring device to achieve motion-transferring; a step is formed at the end of the driving column so that the driving column is rotatably maintained in the motion-transferring device without running out when assembled; and the central axis of the driving column deviates a distance from the central axis of the operating member, thereby the driving column and the motion-transferring device form the eccentric cam mechanism together;
the motion-transferring device is constituted by a transmission member and a cross member, wherein the transmission member has a body, and wherein one lug extends from one side of the body and provided with a driving hole to be engaged with the driving column, two parallel lugs being extended from the other side of the body and being provided with coaxial driving holes respectively;
the valve core has a disc-shaped body, wherein the outer periphery of the body is integrally provided with hinge shafts; one side of the body is a smooth surface, while the other side is provided with two parallel ribs; the ribs are respectively provided with two lugs at the upper portion thereof, and the two lugs are respectively provided with opening/closing holes; and
the driving hole and the opening/closing holes are connected with the cross member to form a universal joint structure together, and actions on the operating mechanism are transferred to the valve core to open/close the valve.

7. The valve according to claim 1, wherein:
the operating mechanism further comprises a locking member, wherein the bottom of the operating member is formed with a positioning hole and an anti-off buckle integrally projects therefrom; the locking member has a plate-shaped body provided with an anti-off hole, wherein a positioning column integrally extends from the upper surface of the plate-shaped body, while a driving column extends from the lower surface of the plate-shaped body near one end of the plate-shaped body, and the end of the driving column is formed with a step, so that the driving column is rotatably maintained in the driving hole of the motion-transferring device without disengagement when assembled, and wherein the other end of the plate-shaped body is provided with a locking hook;
the motion-transferring device is constituted by a transmission member and a cross member, wherein the transmission member has a body which has a lug extending from one end thereof and two parallel lugs extending from the other end thereof, wherein the lug is provided with a driving hole to be engaged with the driving column, and two coaxial driving holes are respectively provided on the two parallel lugs;
the valve core has a disc-shaped body, wherein the outer periphery of the body is integrally provided with hinge shafts; one side of the body is a smooth surface, while the other side is provided with two parallel ribs, wherein the upper portions of the ribs are respectively provided with two lugs, and the two lugs are respectively provided with opening/closing holes; and wherein a locking pole is provided between the two ribs; and
the driving hole and the opening/closing holes are connected with the cross member to form a universal joint structure together, thus actions on the operating mechanism are transferred to the valve core to open/close the valve, and the locking hook is engaged with the locking pole so that the valve is maintained in a closed position when the valve is closed.

8. The valve according to claim 1, wherein the lower part of the operating member is provided with a snapping slot used to be engaged with the snap so that the operating member is rotatably held on the valve body.

9. The valve according to claim 1, wherein sealing rings are respectively provided between the valve core and valve body, and between the operating mechanism and the valve body.

10. A valve with a hinged valve core, comprising:
a valve body, a valve core, an operating mechanism, a motion-transferring device, and a locking device, the valve body is a housing, wherein the housing is formed with an operating hole used to partially accommodate the operating mechanism and a channel having an inlet and an outlet is formed in the housing, wherein:
the valve core is connected with the valve body through a hinge,
and the operating mechanism is used to operate the valve core to be rotated around a central axis of the hinge to open/close the valve, wherein the operating mechanism comprises a handle and an operating member, wherein the operating member is rotatably held on the valve body and will not be able to move in the direction perpendicular to the direction of flow;
the motion-transferring device is used to transfer actions on the operating mechanism to the valve core, wherein the operating mechanism and the motion-transferring device form an eccentric cam mechanism together and the motion-transferring device is driven by the operating mechanism through the eccentric cam mechanism, and when the valve is closed or opened, the valve core is locked on the valve body through the locking device,
guiding grooves are provided over the channel of the valve body;
the bottom of the operating member is provided with a gear and a locking hook;

the motion-transferring device is a plate-shaped member having a plate-shaped body, wherein a hole is provided at the middle portion of the plate-shaped body and a rack is provided on one sidewall surrounding the hole, the rack being used to be engaged with the gear provided on the operating member to achieve motion-transferring between the operating member and the motion-transferring mechanism; one end of the plate-shaped body is provided with a driving rod; and one side of the plate-shaped body is provided with sliding rails, wherein the sliding rails are engaged with the guiding grooves provided on the valve body, so that the motion-transferring mechanism is movable in the valve body along the guiding grooves; and the valve core has a disc-shaped body, wherein the outer periphery of the body is integrally provided with the hinge shafts; one side of the body is a smooth surface, and the other side is provided with a locking pole; wherein a sliding slot is provided between the locking pole and the body, and wherein the locking pole is used to be engaged with the locking hook of the motion-transferring device, and the sliding slot is used to be engaged with the driving rod of the motion-transferring device to open/close the valve.

11. The valve according to claim 10, wherein the locking hook comprises an initial portion, an intermediate portion, and a terminal portion, wherein the initial portion is an inclined surface acting as a direction guide, and the locking hook is used to be engaged with a locking pole provided on the valve core, so that during closing the valve, when the locking pole contacts with the initial portion of the locking hook, the initial portion will apply an inward force on the locking pole under the effect of the inclined surface as the operating member is further rotated, and when the locking pole is pulled to the intermediate portion, a side surface of the locking pole is engaged with the terminal portion of the locking hook, and the valve is tightly closed and locked at this point.

12. The valve according to claim 10, wherein the sliding slot is an elongated slot.

13. A valve with a hinged valve core, comprising:
a valve body, a valve core, an operating mechanism, a motion-transferring device, and a locking device, the valve body is a housing, wherein the housing is formed with an operating hole used to partially accommodate the operating mechanism and a channel having an inlet and an outlet is formed in the housing, wherein:
the valve core is connected with the valve body through a hinge,
and the operating mechanism is used to operate the valve core to be rotated around the central axis of the hinge to open/close the valve, wherein the operating mechanism comprises a handle and an operating member, wherein the operating member is rotatably held on the valve body and will not be able to move in the direction perpendicular to the direction of flow; and
the motion-transferring device is used to transfer actions on the operating mechanism to the valve core, wherein the operating mechanism and the motion-transferring device form an eccentric cam mechanism together and the motion-transferring device is driven by the operating mechanism through the eccentric cam mechanism, and when the valve is closed or opened, the valve core is locked on the valve body through the locking device,
wherein a driving column integrally projects from the bottom of the operating member and is used to be engaged with the motion-transferring device to achieve motion-transferring; a step is formed at the end of the driving column so that the driving column is rotatably maintained in the motion-transferring device without running out when assembled; and the central axis of the driving column deviates a distance from the central axis of the operating member, thereby the driving column and the motion-transferring device form the eccentric cam mechanism together;
the motion-transferring device is constituted by a transmission member and a cross member, wherein the transmission member has a body, and wherein one lug extends from one side of the body and provided with a driving hole to be engaged with the driving column, two parallel lugs being extended from the other side of the body and being provided with coaxial driving holes respectively;
the valve core has a disc-shaped body, wherein the outer periphery of the body is integrally provided with hinge shafts; one side of the body is a smooth surface, while the other side is provided with two parallel ribs; the ribs are respectively provided with two lugs at the upper portion thereof, and the two lugs are respectively provided with opening/closing holes; and
the driving hole and the opening/closing holes are connected with the cross member to form a universal joint structure together, and actions on the operating mechanism are transferred to the valve core to open/close the valve.

* * * * *